Sept. 19, 1944.   M. B. CAMERON   2,358,625
CAR COUPLER AND TRAIN WIRE CONTROL SYSTEM
Filed Feb. 25, 1942   2 Sheets-Sheet 1

INVENTOR
Mortimer B. Cameron
BY
ATTORNEY

Sept. 19, 1944. M. B. CAMERON 2,358,625
CAR COUPLER AND TRAIN WIRE CONTROL SYSTEM
Filed Feb. 25, 1942 2 Sheets-Sheet 2

INVENTOR
Mortimer B. Cameron
BY
ATTORNEY

Patented Sept. 19, 1944

2,358,625

UNITED STATES PATENT OFFICE 2,358,625

CAR COUPLER AND TRAIN WIRE CONTROL SYSTEM

Mortimer B. Cameron, Edgewood, Pa., assignor to The Westinghouse Air Brake Company, Wilmerding, Pa., a corporation of Pennsylvania Application February 25, 1942, Serial No. 432,205

17 Claims. (Cl. 213—212)

This invention relates to car couplers and more particularly to the tight lock type of couplers for coupling railway cars and to means for controlling train wire circuits between said cars.

Heretofore devices of the above type have usually been applied to vehicles provided with fluid under pressure for controlling brakes and have therefore been designed for control by fluid under pressure which is available, as illustrated for example in Patent No. 1,571,222 issued on February 2, 1926, to H. F. Woernley.

It is now proposed however to use vehicles which are not provided with fluid pressure brakes, consequently there will be no fluid under pressure available for controlling couplers or other devices, and one object of the invention is therefore the provision of coupler and train wire circuit control means for use on such vehicles and therefore adapted to be controlled by means other than compressed air.

Another object of the invention is the provision of a car coupler and train wire circuit controller in which the uncoupling of cars and the making and braking of train wire circuits is controlled electrically.

Another object of the invention is the provision of an automatic, so-called tight lock coupler, in which the uncoupling operation of the coupler is effected by electrically controlled hydraulic pressure means.

Another object of the invention is the provision of novel electrically controlled means for opening and closing electric train wire circuits.

Another object of the invention is the provision of a novel system for selectively closing and opening electric circuits through train wires with car couplers coupled.

Another object of the invention is the provision of electrically controlled means operative automatically upon coupling of two counterpart car couplers to close circuits through train wires and also operative to open such circuits, if desired, with the cars coupled.

Another object of the invention is the provision of a train wire circuit controller adapted to operate automatically upon coupling of two car couplers to close train wire circuits between cars and upon uncoupling of the car couplers to open such circuits and also arranged to open such circuits, if desired, with the car couplers coupled.

Another object of the invention is the provision of an improved system for controlling car couplers and train wire circuit controllers whereby the selective positioning of a manually operative selector switch provides for automatic coupling of the car couplers and closing of the train wire circuits, uncoupling of the car couplers and opening of said circuits, and which switch also provides for opening said circuits with the car couplers coupled.

Another object of the invention is the provision of a system as just defined in which two car couplers and train wire circuit controllers on the adjacent ends of two coupled cars are adapted to be simultaneously controlled from either car by operation of a selector switch thereon.

According to the above objects there is associated with each car coupler an electric motor driven hydraulic pump for providing liquid under pressure to effect uncoupling of the coupler. An electric controller on each car controls the operation of the hydraulic pump motor and also controls the opening and closing of a train wire circuit. A manually operative selector switch on each car is provided for controlling the electric controller on two coupled cars and has three operating positions. In one position the controller on both cars is conditioned to provide for coupling of the car couplers and closing of the train wire circuit upon such coupling. In another position the selector switch provides for operation of the controller on both cars to open the train wire circuit and to effect uncoupling of the car couplers, while in the third position the selector switch provides for operation of the controllers to open the train wire circuit with the couplers remaining coupled.

Another object of the invention is the provision of a system such as above defined embodying two manually operative selector switches, one inside the vehicle for controlling the coupler and train wire circuit and another outside the vehicle, located for instance on one side of the vehicle, for also controlling the coupler and train wire circuit, the two selector switches being so interlocked as to require a certain conditioning of one to provide for control by the other so as to avoid interference of one with the other.

Other objects and advantages will be apparent from the following more detailed description of the invention.

In the accompanying drawings.

*Description*

Figures 1, 2:
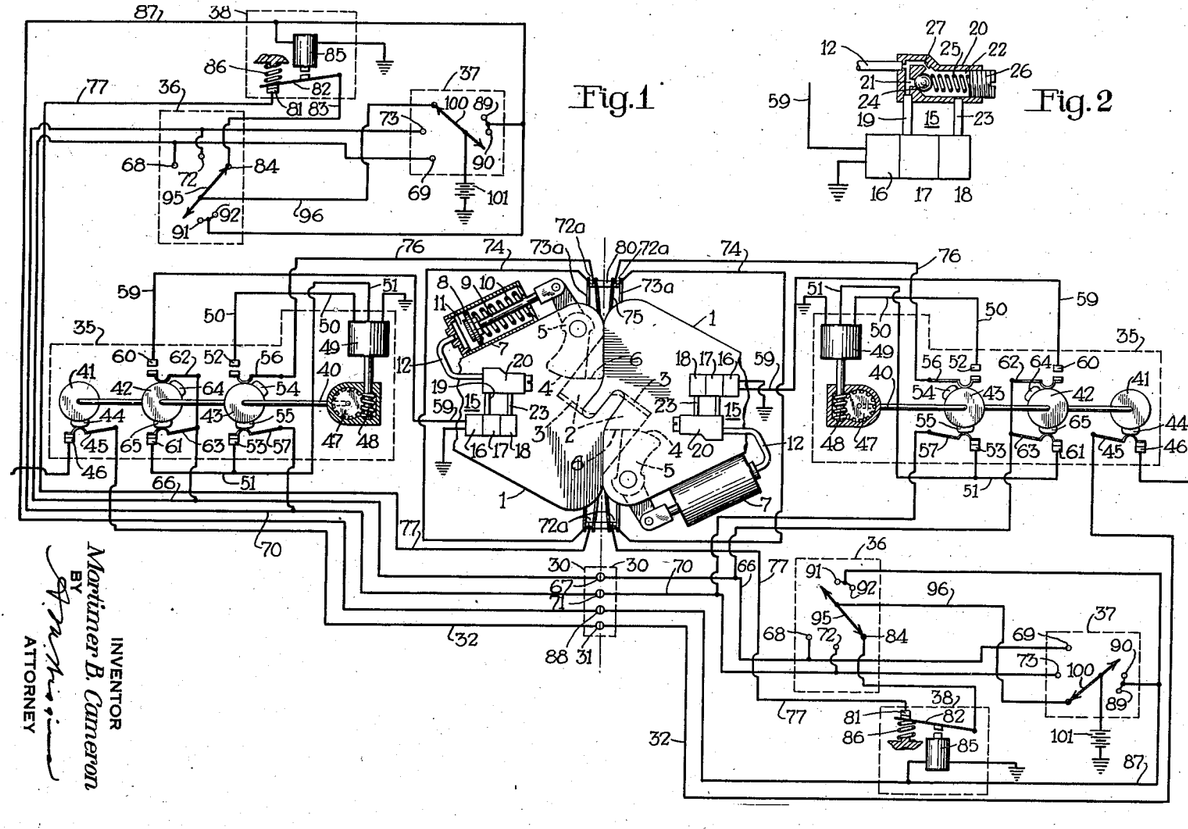
Fig. 1 is a diagrammatic view, partly in section, of two counterpart car couplers and train wire connectors shown in coupled relation, and of the coupler and electric train wire control system constructed in accordance with the invention.
Fig. 2 is an enlarged view, partly in section, of an uncoupling control device associated with each of the couplers shown in Fig. 1.
Figures 3, 4:
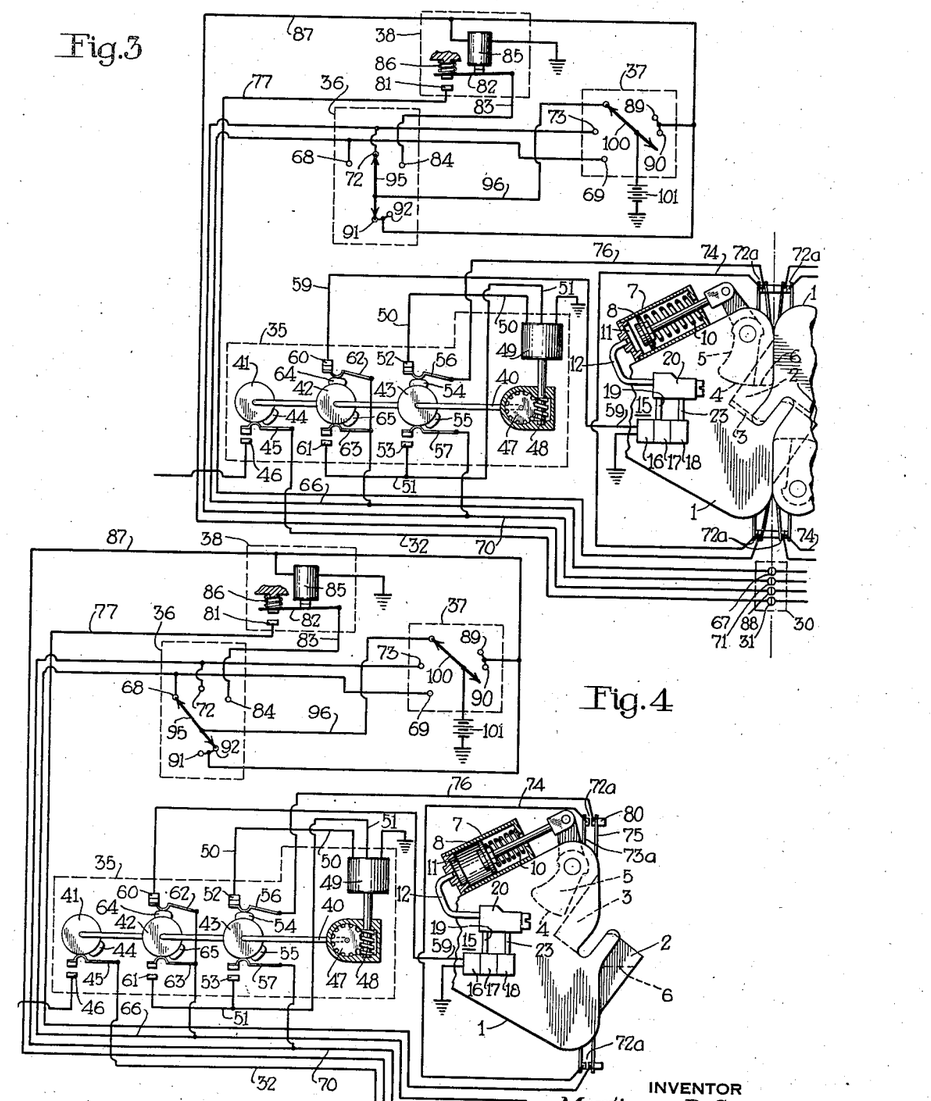
Fig. 3 is a diagrammatic view of a portion of the system shown in Fig. 1 but with certain parts shown in a different position.
Fig. 4 is a view similar to Fig. 3 but with certain parts shown in still another position.

In the drawings, the reference numerals 1 indicate car couplers of the well known rigid tight lock type such as disclosed in the above referred to Woernley patent. Each coupler 1 comprises a nose portion 2 adapted to engage or interlock with the counterpart coupler within a recess 3, and also comprises a pivoted latch 5 which has a cam surface 4 for bearing against a surface 6 in the nose portion of the counterpart coupler for locking the couplers together, as shown in Figs. 1 and 3.

An uncoupling cylinder 7 is associated with each coupler 1 and comprises a casing containing a piston 8 connected by a piston rod 9, projecting from one side thereof, to the pivoted latch 5. A coil spring 10 encircling rod 9 within the cylinder 7 acts on one side of piston 8 and thereby through said rod to force the latch 5 into interlocking relation with the surface 6 of the counterpart coupler.

The piston 8 has at the opposite side a pressure chamber 11 which is connected to a pipe 12 through which liquid under pressure may be supplied to and released from said chamber. With the liquid in chamber 11 under relatively low pressure, such as equal to that of the atmosphere, the spring 10 will maintain the coupler latch 5 in the locking position as shown in Fig. 1, however, upon an increase in the pressure of liquid in chamber 11 to a desired relatively high degree, the piston 8 will move from the coupling position as shown in Fig. 1 to an uncoupling position as shown in Fig. 4 and during such movement rock the coupler latch 5 out of engagement with surface 6 of the counterpart coupler and to the position shown in Fig. 4. The simultaneous movement of the latches 5 in two counterpart couplers to the position shown in Fig. 4 is adapted to permit the nose portions 2 of the two couplers to move out of the respective recesses 3 for uncoupling the two couplers.

After two couplers are uncoupled as just described, the pressure of liquid in pressure chamber 11 may be relieved, as will be later described, to permit spring 10 to return the coupler latch 5 to substantially the position shown in Figs. 1 and 3 for subsequent coupling with a counterpart coupler. Upon such subsequent coupling of two couplers together, each coupler will rock the latch 5 in the counterpart coupler against the respective spring 10 to permit entry of the nose portions 2 of the couplers into the recesses 3 and when the coupling positions of these parts is attained, as shown in Fig. 1, the latches 5 will be rocked by springs 10 into interlocking relation with surfaces 6 for holding the couplers together.

The supply of liquid under pressure to chamber 11 in the uncoupling cylinder 7 of each coupler is controlled by an electrically operated hydraulic displacement unit 15 which is relatively small in size and adapted to be mounted on or within said coupler. This unit comprises an electric motor 16, a hydraulic pump 17 connected to said motor for operation thereby, and a sump 18 partially filled with liquid.

The motor 16 is adapted to operate the pump 17 to draw liquid from the sump 18 and to discharge same under pressure into a discharge pipe 19 which leads to a safety valve 20. The safety valve 20 has a passage 21 (Fig. 2) which connects the pipe 19 to pipe 12 for thereby conveying liquid displaced by the pump 17 to the unlocking cylinder 7 for operating the piston 8 to move the coupler latch 5 to its uncoupling position.

The safety valve device 20 has a chamber 22 (Fig. 2) connected by a pipe 23 to the sump 18 and this chamber contains a check valve 24 which controls a communication between the passage 21 and said chamber. A coil spring 25 in chamber 22 bears at one end on the valve 24 while its opposite end is supported by a nut 26 which is adjustable to provide a desired seating force on the valve 24. This adjustment is such that the check valve 24 will remain seated until a sufficient degree of liquid pressure is attained in the uncoupling piston chamber 11 by operation of the pump 17 to operate the piston 8 to move the latch 5 to uncoupling position, and to provide for unseating of said valve when the pressure of liquid acting thereon overcomes the spring pressure. Upon the unseating of valve 24, liquid discharged from the pump 17 into passage 21 flows into chamber 22 and thence back to sump 18.

The passage 21 is connected to the sump chamber 22 through a passage containing a restriction 27. During operation of pump 17, a portion of the liquid displaced to passage 21 will leak through the restriction 27 to chamber 22, but the capacity of this restriction is so limited with respect to that pump 17, that regardless of the leak, the uncoupling piston 8 and check valve 24 will operate as above described. After two couplers 1 have been uncoupled, the motor 16 and pump 17 will be stopped, as will be later described, and the restriction 27 in the safety valve device 20 then becomes effective to release liquid under pressure from the uncoupling piston chamber 11 to the sump 18 in order to allow spring 10 to return the coupler latch 5 to substantially the position shown in Figs. 1 and 3 for subsequent coupling with a counterpart coupler. Operation of the motor 16 and pump 17 is required only to effect the uncoupling of two couplers 1 as just described and at other times said motor and pump may be stopped. It will therefore be seen that at the time of coupling two couplers together as previously described, and at which time the piston 8 must reciprocate in the cylinder 7 to allow movement of latch 5 inwardly and then outwardly of the coupler, such reciprocation is permitted due to the piston chamber 11 being open to the sump 18 through the passage containing the restriction 27.

The reference numeral 30 indicates an electric contact carrier which may be associated with each coupler 1 for carrying electric contacts. These contacts in one carrier are provided for engaging corresponding contacts in a counterpart contactor carrier upon coupling of two couplers to thereby electrically connect circuits on one vehicle to counterpart circuits on a connected vehicle. This contactor carrier may be of any suitable form, such for example as shown in Patent 1,394,057 issued to H. F. Woernley on October 18, 1921. For the sake of simplicity, and clarity, however, the contactor carrier is shown in the drawing in diagrammatic form and disposed at one side of the coupler 1.

The contactor carrier 30 may provide for the connecting of any desired number of train wires between cars, but, for illustrative purposes only, is shown as having only one contact 31 connected with a train wire 32. It will be seen that the engaging contacts 31 in the two counterpart carriers 30 shown in Fig. 1 will connect the train wires 32 on two coupled cars.

A circuit controller 35 is provided for controlling the operation of the hydraulic pump motor 16 and the opening and closing of the circuit through train wire 32 back of the contact 31 on each vehicle, and for governing this controller on both of two coupled vehicles there is provided on each vehicle a selector switch 36 adapted to be located inside of the vehicle, as in the cab, and a selector switch 37 adapted to be located outside of the vehicle, as on the vehicle side for operation from the ground, and an interlock switch device 38.

The circuit controller 35 comprises a rockable shaft 40 carrying drums 41, 42, and 43, the drum 41 being provided with a lobe 44 which upon engagement with a flexible contact finger 45 is adapted to urge said finger into electrical contact with a fixed contact 46 for connecting the train wire 32 on the vehicle to the contact 31 in the contact carrier 30. When the lobe 44 is moved out of engagement with finger 45 said finger will move away from contact 46 to thereby open the circuit through the train wire 32 to the contact 31. The shaft 40 may control any number of switches 45, 46 corresponding to the number of train wires which it is desired to control, as will be apparent.

The shaft 40 is connected through a gear 47 and a worm 48 for operation by a reversible motor 49. This motor has one lead 50 through which electric current may be supplied to the motor for effecting operation thereof to turn the shaft 40 to the train wire circuit closing position shown in Fig. 1, and another lead 51 through which electric current is adapted to be supplied for causing operation of the motor in the reverse direction to turn the shaft 40 to the train wire circuit opening position shown in Figs. 3 and 4.

The circuit closing lead 50 is connected to a fixed contact 52 located at one side of the drum 43 while the circuit opening lead 51 is connected to a fixed contact 53 disposed at the opposite side of the drum 43. The drum 43 is provided with two lobes 54 and 55 for operating two fingers 56 and 57 which are disposed at opposite sides of the drum 43 for cooperation with the fixed contacts 52 and 53, respectively. These lobes are so located that in the train wire circuit closing position of the controller shown in Fig. 1, the lobe 55 will hold the finger 57 in contact with the fixed contact 53 while the lobe 54 will be in such a position as to permit finger 56 to be disengaged from the fixed contact 52.

The hydraulic pump motor 16 associated with the coupler 1 is connected by a lead 59 to a fixed contact 60 disposed at one side at the drum 42, while the reversing motor lead 51 is connected to a fixed contact 61 at the opposite side of the drum 42. Two flexible contact fingers 62 and 63 are disposed one at either side of the drum 42 for cooperation with the contacts 60 and 61, and the drum is provided with lobes 64 and 65, respectively, controlling operation of said fingers. The lobe 64 is so arranged as to provide for disengagement of finger 62 from contact 60 with the circuit controller in the position shown in Fig. 1 and to effect engagement therebetween with the circuit controller in the position shown in Figs. 3 and 4, while the lobe 65 is adapted to effect engagement between finger 63 and contact 61 with the controller in the position shown in Fig. 1 and to provide for disengagement of finger 63 from contact 61 with the controller in the position shown in Figs. 3 and 4.

The two contact fingers 62 and 63 are connected together and to an uncoupling wire 66 which is connected to a contact 67 in the electric contact carrier 30 and also to fixed contacts 68 and 69 in the selector switches 36 and 37, respectively. The finger 57 at one side of the circuit controller drum 43 is connected to a wire 70 which is connected to a contact 71 in the contact carrier 30 and also to contacts 72 and 73 in the selector switches 36 and 37, respectively.

A circuit closer or switch 72a is carried by both sides of the coupler 1 adjacent the coupling face thereof. Each of the switches 72a comprises a relatively rigid arm 73a having a contact connected with one end of a wire 74, and a flexible arm 75 also carrying a contact adapted to engage the contact of arm 73a for closing an electric circuit. The contact of arm 75 at one side of the coupler is connected by wire 76 to the flexible finger 56 disposed at one side of the drum 43 in the circuit controller 35, while the contact associated with arm 75 at the opposite side of the coupler head is connected to a wire 77. On the outer face of each flexible arm 75 is a finger 80 adapted to engage a corresponding finger of the switch 72a on a counterpart coupler upon coupling two couplers for flexing the arm 75 in the direction of the arm 73a to effect circuit closing engagement between the contacts carried by the arms 75 and 73a in each switch 72a. When the coupler 1 is uncoupled, the arm 75 of each switch 72a is adapted to move away from the arm 73a to open the circuit controlled through the switch 72a.

When two couplers 1 are coupled, it will now be seen that finger 56 in the circuit controller 35 will be connected by wire 76, switch 72a at one side of the two couplers, wire 74, and switch 72a at the opposite side of the coupler to wire 77, it being noted that this circuit does not extend from one coupler to a counterpart coupler although coupling of two couplers is required for closing same.

The wire 77 extends from the coupler switch 72a to a fixed contact 81 provided in the interlock switch device 38. This device has a movable contact 82 adapted to cooperate with fixed contact 81 for connecting the wire 77 to a wire 83 which leads to a fixed contact 84 in the cab switch device 36.

In the interlock device 38 is a solenoid 85 which is operative upon energization to pull the movable contact 82 out of engagement with the contact 81. Upon deenergization of this solenoid a spring 86 acting on the movable contact 82 is provided for urging same into contact with the fixed contact 81.

The solenoid 85 is connected to a wire 87 which leads to a fixed contact 88 provided in the electric contact carrier 30, to contacts 89 and 90 in the selector switch 37 and to contacts 91 and 92 in the cab selector switch 36.

The cab selector switch device 36 comprises a manually movable contact arm 95 to which is connected a current supply wire 96. This arm has three different operating positions. In one of these positions the arm 95 is adapted to connect wire 96 to contact 84 to provide for coupling of two couplers 1 and for operation of the circuit controllers 35 on two coupler cars to effect closure of train line circuits, such as the circuit through train wires 32. In a second position the arm 95 is adapted to connect wire 96 to fixed contacts 72 and 91 to effect operation of the circuit controllers 35 to open train line circuits, as through the train wires 32, while retaining the counterpart couplers 1 in coupled relation. The arm 95 in its third position connects wire 96 to fixed contacts 68 and 92 in order to effect opening of the circuits through the train wires, as through wires 32 in case such circuits are not already opened, and to also effect operation of uncoupling unit 15 and thereby the coupler unlocking pistons 8 of the two couplers for uncoupling two couplers.

The selector switch 37 located outside of the vehicle also comprises a manually movable contact arm 100 which is permanently connected to any suitable source of electric current such as a battery 101. The arm 100 has three positions like the positions of the arm 95 in the cab switch device 36. In one of these positions it connects the wire 96 to the battery 101 for thereby supplying electric energy to cab switch 36 for rendering it effective to control the circuit controller 35 and coupler release piston 8. In a second position the arm 100 connects battery 101 to contacts 73 and 90 in order to obtain the same result as attained in the second described position of switch arm 95, while in the third position of arm 100, the battery 101 is connected to contacts 69 and 89 for supplying electric current to the same wire as provided for in the third described position of the switch arm 95.

In use, only one handle (not shown) may be provided for operating both of the arms 95 and 100, so that only one of the arms can be operated at one time, and means (not shown) may be provided to permit removal of this handle from the selector devices only when the arms are in the position shown in Fig. 1. It will thus be seen that if the operating handle is applied to the selector switch 36 for operating arm 95, the arm 100 of the selector switch 37 will occupy the position shown in Fig. 1 and thus supply current from battery 101 to wire 96 to thereby render operation of the arm 95 effective. On the other hand, in case the handle is applied to the selector device 37 for operating the arm 100, the arm 95 in the cab switch device 36 will be in the position shown in Fig. 1 to thereby render the arm 100, effective to control the supply of current from battery 101 to the wire 83. In other words, either of the selector switches 36 and 37 must be in a chosen position, such as shown in Fig. 1, in order to permit control by the other switch, so as to thereby avoid interference with intended operation.

*Operation*

Let it be initially assumed that the coupler heads 1 on the adjacent ends of two vehicles are coupled together, that the selector switches 36 and 37 on both vehicles are in the positions shown in Fig. 1 and that the circuit controllers 35 on the two vehicles are also in the positions shown in Fig. 1, the reason for which will be hereinafter brought out.

With the circuit controllers 35 thus positioned, the drums 41 thereof will effect contact between the fingers 45 and contacts 46, and with the contact carriers 30 carried by the couplers in engagement, the circuit through the train wire 32 will therefore be closed.

With the arms 95 and 100 of the selector switches 36 and 37 on both vehicles positioned as shown in Fig. 1, current from the batteries 101 will be supplied only to the wires 83. As a result, the solenoids 85 will be deenergized permitting movement of contacts 82 into engagement with contacts 81 for connecting the wires 83 to wires 77. On each vehicle current thus supplied to wire 77 will then flow through the circuit closing switches 72a at the opposite sides of the respective coupler 1 to the switch finger 56 in the circuit controller 35. At this time, however, the finger 56 is out of contact with the contact 52 so that the circuit ends or is open at this point. It will be noted that the circuit to the finger 56 in each circuit controller 35 is local to each vehicle, that is, it does extend from one vehicle to the other.

With the circuit controllers 35 in the positions shown in Fig. 1, the circuit through the hydraulic pump operating motors 16 is broken at the contacts 60 so that said motors and the pumps 17 will be idle and as a result chamber 11 at one side of the unlocking piston 8 in each coupler will be vented to the sump 18 permitting spring 10 to hold the latch 5 in locking engagement with surface 6 on the counterpart coupler. It will also be noted that lead 50 of each reversing motor 49 is disconnected from finger 56 in the respective circuit controller 35 in this position of said controller but the lead 51 from said motor is connected through the fingers 57 and 63 to wires 70 and 66 leading to the selector switch devices 36 and 37, wherein these wires are disconnected from the switch arms 95 and 100 and thus dead. As a result, the reversible motor 49 on each vehicle will be dead and the circuit controller 35 will remain in the position shown.

*Opening of train line circuits without uncoupling couplers 1*

If for any reason, it is desired to open the circuit through the train wire 32 without effecting uncoupling of the two couplers 1, either one of the selector switch arms 95 or 100 on either one of the two connected vehicles may be moved from the position shown in Fig. 1 to the intermediate position into contact with the fixed contact 72 or 73, respectively. Let it be assumed however that this operation is to be effected from the left hand vehicle, as viewed in Fig. 1, and that the contact arm 95 thereon is the one thus operated into contact with the contact 72 as shown in Fig. 3.

In this position of the selector arm 95 current from the battery 101 is supplied to the wire 70 on the one car and thence through the contacts 71 in the contact carriers 30 associated with the couplers 1 to the corresponding wire 70 on the other car. Current this supplied to the wire 70 on each car flows through the closed contacts 57 and 53 to the reversing motor 49 in circuit controller 35 and thereby causes operation of said motor to turn the shaft 40 and thus the several drums 41, 42, and 43 from the position shown in Fig. 1 to the position shown in Fig. 3 and this simultaneous operation of the drums 41 in both controllers permits movement of the switch fingers 45 out of contact with the fixed contacts 46 thereby opening the train line circuit through wire 32 on both vehicles at a point back of the respective electric contact carriers 30.

At the time the motor operated shaft 40 and drum 43 in each controller 35 attain the position shown in Fig. 3 it will be noted that contact finger 57 is disengaged from the fixed contact 53, thereby opening the circuit between the wire 70 and the reversing motor 49 so as to cause said motor and shaft 40 to stop in this new position.

It will also be noted that the other lead 50 of the reversing motor is, in this position of the controller 35, connected through contact 52 and finger 56 to wire 76 and thence through the switches 72a on the respective coupler to wire 77 leading to the interlock switch device 38. This is of no consequence on the vehicle on which the cab switch arm 95 is in contact with the contact 72 and thus disengaged from contact 84, but on the other vehicle, where said switch arm will still occupy the position shown in Fig. 1, the engagement of contacts 52 and 56 in the circuit controller 35 would close a circuit to the reversing motor 49 on that vehicle by way of the switch arm 95 and wire 77 and cause same to operate and turn shaft 40 back to the position shown in Fig. 1, in which the circuit through control wire 70 would again be closed through said motor and cause another reversing thereof. The interlock switch devices 38 are provided to prevent this reversing back and forth of the circuit controller 35 on the vehicle opposite that on which the selector switch 36 is operated, as will now be described.

When the arm 95 of the selector switch 36 is moved into engagement with the fixed contact 72, it will be noted that current is also supplied from the battery 101 through said arm and fixed contact 91 to wire 87 which on the one vehicle is connected through the contact 88 in the contact carrier 30 carried by the coupler 1 to the corresponding wire on the connected vehicle. As a result, the solenoids 85 on both vehicles will be energized and lift the movable contacts 82 out of engagement with the fixed contacts 81.

Energization of solenoid 85 on the vehicle on which the selector switch 36 is operated is of no consequence since arm 95 is disengaged from contact 84, but on the other vehicle the energization of solenoid 85 opens the connection between the battery 101 and the wire 77 so as to prevent the flow of current from said battery to the reversing motor lead 50 when the circuit controller attains the position connecting wire 76 to said lead. Thus the circuit controller on the connected vehicle will be stopped in the same position as the controller on the vehicle on which the selector device 36 is operated.

With the circuit controller 35 in the position shown in Fig. 3 it will be noted that wire 59 connected to the hydraulic operating pump motor 16 is connected through the contact 60 and finger 62 to wire 66 but this wire is not energized with the selector switch arm 95 in contact with the fixed contact 72 as a result of which the hydraulic pump 17 and motor 16 remain stationary and the coupler latches 5 remain in their locking positions, thereby holding the two coupler heads 1 locked together. Thus the position in which arm 95 is connected with the contacts 72 and 91 provides for opening of the circuit through train wire 32 on both vehicles without however effecting uncoupling of the two couplers 1.

*Uncoupling and opening of train wire circuits*

With the arm 95 of the selector switch 36 in the position shown in Fig. 1 providing for coupling of the two couplers 1 and closure of the train line circuit through wires 32, let it be assumed that it is desired to effect uncoupling of the couplers and to also open the circuit through said train wire. To accomplish this end, the selector switch arm 95 on one vehicle is moved to the position shown in Fig. 4 in which current from the battery 101 is supplied through contact 68 to the uncoupling wire 66 and through contact 92 to wire 87. As a result of this latter supply, both of the solenoids 85 are energized for the same purpose as hereinbefore described.

Current supplied by the selector switch 36 to the uncoupling wire 66 on one vehicle flows through the contacts 67 in the contact carriers 30 to the uncoupling wire 66 on the other vehicle and from said wires 66 through the engaging contacts 63 and fingers 61 in the two circuit controllers 35 to the leads 51 leading to the reversing motors 49. The reversing motors then operate to turn the shafts 40 and the drums carried thereby from the position shown in Fig. 1 to that shown in Fig. 4 in which the circuit through the train wire 32 is opened on both vehicles in the same manner as before described.

It will be noted that with the circuit controllers 35 in the position shown in Fig. 1 the circuit to the hydraulic pump operating motors 16 is broken at contacts 60 and 62 to thus prevent the flow of current from the uncoupling wire 66 to said motors with the controllers in this position. However, when each controller 35 is operated by its reversing motor 49 to the position shown in Fig. 4, the lobe 64 on drum 42 moves the finger 62 into engagement with contact 60 and thereby supplies electric current from the wire 66 to wire 59 leading to the pump motor 16. Each motor 16 is thereby caused to operate its pump 17 to pump liquid into the uncoupling piston chamber 11 to effect movement of the piston 8 and thereby the coupler latch 5 to the uncoupling position shown in Fig. 4 whereupon the two couplers 1 may be moved apart. It will thus be seen that when the selector switch arm 95 is moved to the uncoupling position into contact with contacts 68 and 92 the circuit controllers 35 on both vehicles first operate to break the circuit through train wire 32 and to then cause operation of the uncoupling motor 16 and pump 17 to permit uncoupling of the two car couplers 1.

It will also be noted that when the circuit controllers 35 attain the position shown in Fig. 4 the contact fingers 63 therein are moved out of engagement with contacts 61 for cutting off the supply of electric current from the uncoupling wires 66 to the reversing motors 49 to thereby stop said motors and the circuit controllers in the positions shown in Fig. 4 in which the circuit through train wires 32 is open and current is being supplied to motors 16 for causing uncoupling operation thereof.

After the uncoupling operation has been completed as just described, the handle 95 in the circuit selector 36, which had been operated on one vehicle to effect uncoupling, should be moved back to its normal position shown in Fig. 1 to thereby cut off the supply of current to the pump motor 16 for stopping its operation and thereby the operation of the pump 17. On the other vehicle, where the selector handle 95 is still in its normal position shown in Fig. 1, the current supply to the pump motor 16 is automatically cut off upon uncoupling of the two couplers and consequent disconnecting the wire 66 on this vehicle from the wire 66 on the other vehicle, so that the pump motor 16 on this vehicle will be automatically stopped. When the pump 17 on each vehicle is thus stopped, the liquid pressure in the uncoupling piston chamber 11 will be relieved through the restriction 27 to the sump to permit spring 10 to return the coupler latch 5 to its coupling position shown in Figs. 1 and 3.

When the selector switch arm 95 on the one vehicle is returned to its coupling position shown in Fig. 1, it should be noted that the solenoid 85 on that vehicle will be deenergized to permit arm 82 to be moved into contact with contact 81 and the battery 101 will be again connected through the interlock switch 38 to wire 77. The switches 72a being opened at this time however prevents the supply of current from wire 77 to the reversing motor 49, so that the circuit controller 35 will remain in its uncoupled position shown in Fig. 4. On the other vehicle where the selector switch arms remained in their normal positions shown in Fig. 1 during the uncoupling operation, the battery 101 will also be connected to wire 77 upon deenergization of solenoid 75, which occurs upon uncoupling of the two couplers and disconnecting the wire 87 on this vehicle from the wire 87 on the other vehicle. The opening of switches 72a on this vehicle however also prevents current being supplied from wire 77 to the reversing motor 49, so that the circuit controller on this vehicle will likewise remain in its uncoupled position.

The apparatus is now in condition for again coupling with a counterpart coupler of another car.

*Uncoupling of couplers 1 with circuit through train wire 32 already broken*

Let it be assumed that the selector switch handle 95 is in the position shown in Fig. 3 opening the circuit through train wires 32 and that it is now desired to effect uncoupling of two couplers 1. To accomplish this the arm 95 is merely moved into contact with the contact 68 for supplying current to the uncoupling wire 66. With the circuit controllers 35 on the two vehicles in the position opening the circuit through the train wires 32, the fingers 62 therein are in position connecting the uncoupling wire 66 to the wire 59 leading to the hydraulic pump motor 16, so that without any operation of the circuit controllers 35 under this condition the motors 16 will be caused to operate immediately in response to movement of the arm 95 to the position just mentioned to effect movement of the coupler latches 5 to their uncoupling positions to allow parting of the couplers 1. After this is completed, the arm 95 should be returned to the normal position as before mentioned.

*Selective operation of uncoupling and opening of train line circuit from different stations on the one vehicle or on the connected vehicle*

Without further explanation it is believed it will be apparent that with the cab selector switch arm 95 in its normal position shown, the operation of arm 100 in the selector switch 37, located on the side of the vehicle, will effect operation of the circuit controllers 35 and coupler latches 5 on two connected vehicles in accordance with the different positions of the arm which correspond to the positions of arm 95 in the same manner as above described for the selector switch 36. Likewise it will be evident that these operations may be controlled in the same manner as above described by operation of either of the selector switch devices 37 or 36 on the opposite or connected vehicle.

*Automatic coupling of two car couplers 1 and closing of circuit through train wire 32*

With the coupler latch 5 and circuit controller 35 in the condition above described at the end of an uncoupling operation and with the arms 95 and 100 of the two selector switches 36 and 37 in the normal position shown in Fig. 1 on the adjacent ends of two vehicles which it is desired to couple together, the automatic coupling thereof and closing of the circuit through train wire 32 will be effected in the following manner.

As the two vehicles are brought together into coupling relation the nose 2 on each coupler enters the recess 3 in the counterpart coupler and rocks the latch 5 out of the recess until the coupled positions are attained, at which time the spring 10 in each coupler becomes effective to actuate the piston 8 and stem 9 to rock the latch 5 into locking engagement with surface 6 on the counterpart coupler for thereby securing the couplers in locked relation.

During this coupling of two couplers the fingers 80 of the switch devices 72a at opposite sides of the one coupler engage the corresponding fingers of the switch devices 72a on the counterpart coupler and effect closure of the several switch devices 72a. With the selector switch arms 95 in their normal position shown in Fig. 1, current supplied to wire 77 on each vehicle then flows through the two switches 72a associated with the respective coupler to contact finger 56 in the respective circuit controller 35. At this time the contact finger 56 is in engagement with the fixed contact 52 so as to supply current to the reversing motor 49. This motor on each vehicle then operates to turn the shaft 40 and drums 41, 42, and 43 from the uncoupled position shown in Fig. 3 to the coupled position shown in Fig. 1, in which the finger 56 is disengaged from contact 52 to thereby stop further operation of the reversing motor 49. In this coupled position the contact finger 45 is in engagement with the fixed contact 46 in each circuit controller 35 to thereby close the circuit through train wire 32. Thus coupling of the couplers 1 is automatically effected in the usual manner and the operation of switches 72a, due to such coupling, automatically cause the circuit controllers 35 on both vehicles to operate to close the circuit through the train wire 32. The system is now in the same condition as it was assumed to be at the beginning of the description of operation.

*Summary*

It will now be seen that I have provided a relatively simple but positive and practical system for selectively controlling from either one of two coupled vehicles or from either one of a plurality of control stations on either of said vehicles the opening and closing of a train wire circuit and the uncoupling of the couplers connecting two vehicles. The manual control system provides for opening of the train wire circuit without effecting uncoupling of counterpart couplers, and it also provides for opening of such circuit and uncoupling of the couplers, as desired according to different conditions, and it will also be noted that at the end of an uncoupling operation the system is conditioned to provide for automatic coupling of the couplers and automatic closing of the train line circuit. Of importance is the fact that no compressed air is required for controlling any of the operation above described. Hydraulic pressure is used for effecting movement of the coupler latches to the positions which permit uncoupling of two counterpart couplers. Such movement of coupler latches usually requires a relatively great degree of force to break the latches loose from a counterpart coupler, but such forces are readily attained in this improved structure by the electrically operated hydraulic pump associated with each coupler. The circuit controller and reversing motor 49 forming a part thereof constitutes a relatively simple and effective arrangement for the purpose described, and by controlling both the train wire circuit and uncoupling motor 16 through the circuit controller, the opening of the train wire circuit must occur before release of the coupler latch thereby precluding the possibility of having an exposed live train wire contact in the contact carrier 30 when the apparatus is in an uncoupled condition.

Having now described my invention, what I claim as new and desire to secure by Letters Patent, is:

1. A system for controlling a car coupler locking member having a coupling position and an uncoupling position and for also controlling a train wire circuit, comprising in combination, a train wire switch for controlling said circuit, control means for said locking member operative upon energization to effect movement of said locking member to uncoupling position, a circuit controller operative upon supply of electric current to one conductor to first effect operation of said train wire switch to open said train wire circuit and to then connect said locking member control means to said conductor to effect energization of the said control means, said circuit controller being operative upon supply of current to another conductor to effect closure of said train wire switch and to effect deenergization of said control means, a manual switch having one position for supplying current to said one conductor and another position for supplying current to said other conductor, and another switch carried by said coupler controlling the circuit through said other conductor and arranged to close said circuit upon coupling of a counterpart coupler and to open said circuit upon uncoupling of the couplers.

2. A system for controlling a car coupler locking member having an uncoupling position and for also controlling a train wire circuit, comprising in combination, a manually operative selector switch having a coupling position for supplying electric current to one conductor, and an uncoupling position for supplying electric current to another conductor, an uncoupling motor operative upon supply of electric current to effect movement of said locking member to said uncoupling position, and a circuit controller comprising switch means, and an operating motor for controlling said switch means, said switch means having a coupling position for closing said train wire circuit, for connecting said operating motor to said other conductor, and for disconnecting same from said one conductor and for also opening a circuit to said uncoupling motor, said switch means having an uncoupling position for opening said train wire circuit, for disconnecting said operating motor from said other conductor and for connecting same to said one conductor, and for connecting said uncoupling motor to said other conductor, and a switch carried by said coupler controlling the circuit through said one conductor and closable upon coupling said coupler with a counterpart coupler and openable at other times.

3. A system for controlling a car coupler locking member having an uncoupling position and for also controlling a train wire circuit, comprising in combination, a manually operative selector switch having a coupling position for supplying electric current to one conductor, and an uncoupling position for supplying electric current to another conductor, an uncoupling motor operative upon supply of electric current to effect movement of said locking member to said uncoupling position, and a circuit controller comprising switch means, and an operating motor for controlling said switch means, said switch means having a coupling position for closing said train wire circuit, for connecting said operating motor to said other conductor, and for disconnecting same from said one conductor and for also opening a circuit to said uncoupling motor, said switch means having an uncoupling position for opening said train wire circuit, for disconnecting said operating motor from said other conductor and for connecting same to said one conductor, and for connecting said uncoupling motor to said other conductor, and a switch controlling the circuit through said one conductor closable upon coupling said coupler with a counterpart coupler and openable at other times, said manually operable selector switch also having a third position for supplying current to a third conductor but not to said one and said other conductors, said switch means in its said coupling position connecting said operating motor to said third conductor and in its said uncoupling position disconnecting said operating motor from said third conductor.

4. A system for controlling a car coupler locking member having an uncoupling position and for also controlling a train wire circuit, comprising in combination, a manually operative selector switch having a coupling position for supplying electric current to one conductor, an uncoupling position for supplying electric current to a second conductor, and a third position for supplying electric current to a third conductor, an uncoupling motor operative upon supply of electric current to effect movement of said locking member to said uncoupling position, and a circuit controller comprising a control motor and switch means operative by such motor to either of two control positions, said switch means in one position closing said train wire circuit, opening the circuit to said uncoupling motor, and connecting said control motor to said second and third conductors and disconnecting same from said first conductor, said switch means in its other position opening said train wire circuit, connecting said uncoupling motor to said third conductor, and connecting said control motor to said first conductor and disconnecting the said control motor from said second and third conductors, and switch means in the circuit through said first conductor and control motor operable to close such circuit upon coupling of a counterpart coupler and to open such circuit upon uncoupling of said counterpart coupler.

5. A system for controlling a car coupler locking member having an uncoupling position and for also controlling a train wire circuit, comprising in combination, a manually operative selector switch having a coupling position for supplying electric current to one conductor, an uncoupling position for supplying electric current to a second conductor, and a third position for supplying electric current to a third conductor, an uncoupling motor operative upon supply of electric current to effect movement of said locking member to said uncoupling position, and a circuit controller comprising rockable switch means having two control positions, and a reversible motor operative upon movement in one direction to move said switch means to one of said positions and upon movement in the reverse direction to move said switch means to the other of its positions, said switch means in one of its positions closing said train wire circuit, opening the circuit to said uncoupling motor, and connecting said control motor to said second and third conductors and disconnecting same from said first conductor, and in the other position opening said train wire circuit, connecting said uncoupling motor to said third conductor and connecting said control motor to said first conductor and disconnecting same from said second and third conductors, and switch means in the circuit between said first conductor and control motor operable to close said circuit upon coupling of a counterpart coupler and to open such circuit upon uncoupling of said counterpart coupler.

6. A system for selectively controlling the coupling and uncoupling of the locking member of a car coupler, and the opening and closing of a train wire circuit, comprising in combination, an uncoupling motor operative upon energization to effect movement of said locking member to uncoupling position, means operative upon de-energization of said motor to effect movement of said locking member to coupling position, a circuit selector comprising a control motor and switch means operative by said motor to either of two positions, said switch means in one of its two positions closing said train wire circuit, disconnecting said control motor from a first conductor and connecting same to a second conductor and to a third conductor, and opening a circuit to said uncoupling motor, and said switch means in its other position opening said train line circuit, disconnecting said control motor from said second and third conductors and connecting same to said first conductor and also connecting said uncoupling motor to said third conductor, a switch in said first conductor closable upon coupling of said coupler with a counterpart coupler and openable upon uncoupling the couplers, and a manually operative selector switch having one position for supplying electric current to said first conductor, a second position for supplying electric current to said second conductor, and a third position for supplying electric current to said third conductor.

7. A system for controlling on two connected cars the locking members of two counterpart car couplers having locking positions for securing said couplers together and unlocking positions providing for uncoupling of said couplers and for also controlling the opening and closing of a train wire circuit through two counterpart electric contactors, said system comprising on each car uncoupling means operative upon energization to effect movement of the coupling locking member to uncoupling position to provide for uncoupling of said couplers, a manually operative selector switch on each car having a coupling position for supplying electric current to one conductor and an uncoupling position for supplying electric current to a second conductor, said contactors connecting said second conductor on one car to said second conductor on the coupled car, switch means on each car having one position for closing said train line circuit and another position for opening same, control means on each car operative upon energization to move said switch means to its different positions, said switch means on both cars in said one position connecting said control means to said second conductor and disconnecting same from said first conductor and opening the circuit of said uncoupling means, and in said other position connecting said control means to said first conductor and disconnecting same from said second conductor and connecting said uncoupling means to said second conductor, other switch means on each car in the circuit including said first conductor and said control means operative upon coupling of the two couplers to close the circuit and upon uncoupling of said couplers to open the circuit, a third conductor on each car connected together through said contactors and supplied with current in the second position of said manually operative selector switch, and means on each car connected to said third conductor and operable upon the supply of electric current thereto for opening the circuit through said one conductor.

8. A system for controlling on two connected cars the locking members of two counterpart car couplers having locking positions for securing said couplers together and unlocking positions providing for uncoupling of said couplers and for also controlling the opening and closing of a train wire circuit through two counterpart electric contactors, said system comprising on each car uncoupling means operative upon energization to effect movement of the coupling locking member to uncoupling position to provide for uncoupling of said couplers, a manually operative selector switch on each car having a coupling position for supplying electric current to one conductor and an uncoupling position for supplying electric current to a second conductor, said contactors connecting said second conductor on one car to said second conductor on the coupled car, switch means on each car having one position for closing said train line circuit and another position for opening same, control means on each car operative upon energization to move said switch means to its different positions, said switch means on both cars in said one position connecting said control means to said second conductor and disconnecting same from said first conductor and opening the circuit of said uncoupling means, and in said other position connecting said control means to said first conductor and disconnecting same from said second conductor and connecting said uncoupling means to said second conductor, other switch means on each car in the circuit including said first conductor and said control means operative upon coupling of the two couplers to close the circuit and upon uncoupling of said couplers to open the circuit, a third conductor on each car connected together through said contactors and supplied with current in the second position of said manually operative selector switch, an interlock switch on each car operative to prevent supply of current to said first conductor with said selector switch in said coupling position, and a magnet on each car connected to said third conductor for controlling said interlock switch and operative upon energization by current supplied to said third conductor to actuate said interlock switch to open the circuit controlled thereby.

9. A system for controlling the coupling locks of two counterpart car couplers and the opening and closing of a train wire circuit through two counterpart electric contactors carried by the adjacent ends of two vehicles, said system comprising on each vehicle a source of electric current, a selector switch on each vehicle having one position for connecting said source of current with one conductor, a second position for connecting said source of current to a second conductor, and a third position for connecting said source of current to a third conductor, said counterpart electric contactors connecting the said second and third conductors on one vehicle with the corresponding conductors on the other vehicle, uncoupling means on each vehicle operative upon energization to effect movement of said coupler lock on that vehicle to its uncoupling position, a circuit controller on each vehicle comprising switch means having two positions and a control motor operative upon energization to actuate said switch means to its different positions, said switch means on each vehicle when in one position closing said train wire circuit, opening the circuit of said electric uncoupling means on that vehicle and connecting said control motor on that vehicle to said second and third conductors to thereby render such motor operative upon movement of said selector switch to either said second or third positions to effect movement of the connected switch means to its other position, said switch means on each vehicle when in its said other position opening said train wire circuit, disconnecting said control motor on that vehicle from said second and third conductors and connecting same to said first conductor on such vehicle and also connecting said electric uncoupling means on the respective vehicle to said second conductor to render such uncoupling means effective to effect movement of the respective coupler lock to its unlocking position with said selector switch in said second position and ineffective with said selector switch in said third position, a switch in said first conductor on each vehicle associated with the coupler and closable upon coupling with the counterpart coupler and openable upon uncoupling of the couplers to thereby provide for movement of said switch means on each vehicle from the position opening said train wire circuit to the position for closing same only upon coupling of the counterpart couplers with said selector switch in said first position, an interlock switch on each vehicle operative to disconnect said first conductor from said source of current with said selector switch in said first position, a fourth conductor on each vehicle, said electric contactors connecting the said fourth conductor on one vehicle to the corresponding conductor on the other vehicle, the selector switch on each vehicle in both the second and third positions thereof, supplying current from said source to said fourth conductor, and a magnet on each vehicle connected to said fourth conductor for energization by current supplied thereto to open the interlock switch on the respective vehicle.

10. A system for controlling the locking member of a car coupler and the opening and closing of a train wire circuit comprising in combination, electric means operative upon energization to effect movement of said locking member to said uncoupling position, a switch for controlling the circuit through said train wire, a selector switch movable manually to one position to supply electric current to one conductor, to a second position for supplying electric current to a second conductor, and to a third position for supplying electric current to a third conductor, means operative in accordance with the position of said selector switch for controlling the operation of said electric means and train line switch and conditionable in the first position of said selector switch to provide for deenergization of the locking member control means and closure of said train line switch and operative upon movement of said selector switch to said second position to effect movement of said train line switch to its circuit opening position and to retain said locking member control means deenergized and operative upon movement of said selector switch to said third position to hold said train line switch open and effect energization of said locking member control means to provide for uncoupling of said coupler, and a second selector switch having a first position for supplying electric current to said first conductor, a second position for supplying electric current to said second conductor and a third position for supplying electric current to said third conductor, the current supply to said conductors through the first named selector switch being provided by the second named selector switch in its first named position and the current supply from said second selector switch to said first conductor being provided through the first named selector switch in its first named position.

11. A system for controlling the opening and closing of a train wire circuit through two counterpart electric contactors carried by the adjacent ends of two vehicles adapted to be coupled together by two counterpart car couplers, said system comprising on each vehicle, a train wire switch for controlling the circuit through said train wire and having a circuit closing position and a circuit opening position, a manually operative selector device on each vehicle having one position for supplying current to one conductor and a second position for supplying current to a second conductor, said electric contactors connecting said conductors on one vehicle with those on the other vehicle, a motor on each vehicle for actuating the respective train wire switch, and switch means associated with said motor and operative in the circuit closing position of said train wire switch to connect said motor to said second conductor and to open such connection upon movement of said train line switch to its circuit opening position, said switch means in said circuit opening position connecting said motor to said first conductor and being operative upon movement of said train wire switch to its circuit closing position to disconnect said motor from said first conductor, and other switch means on each vehicle controlling the connection between the manually operative selector switch and the switch means associated with said motor on such vehicle and operative to close such connection upon coupling of said counterpart couplers and to open same upon uncoupling of said couplers to thereby render said motor effective to return said train line switch to its circuit closing position only upon coupling of said couplers.

12. A system for controlling the opening and closing of a train wire circuit through two counterpart electric contactors carried by the adjacent ends of two vehicles adapted to be coupled together by two counterpart car couplers, said system comprising on each vehicle, a train wire switch for controlling the circuit through said train wire and having a circuit closing position and a circuit opening position, a manually operative selector device on each vehicle having one position for supplying current to one conductor and a second position for supplying current to a second conductor, said electric contactors connecting said conductors on one vehicle with those on the other vehicle, a motor on each vehicle for actuating the respective train wire switch, and switch means associated with said motor and operative in the circuit closing position of said train wire switch to connect said motor to said second conductor and to open such connection upon movement of said train line switch to its circuit opening position, said switch means in said circuit opening position connecting said motor to said first conductor and being operative upon movement of said train wire switch to its circuit closing position to disconnect said motor from said first conductor, other switch means on each vehicle controlling the connection between the manually operative selector switch and the switch means associated with said motor on such vehicle and operative to close such connection upon coupling of said counterpart couplers and to open same upon uncoupling of said couplers to thereby render said motor effective to return said train line switch to its circuit closing position only upon coupling of said couplers, a third conductor supplied with electric current in said second position of said selector switch on each vehicle, said electric contactors connecting said third conductor on one vehicle with the corresponding conductor on the other vehicle, an interlock switch on each vehicle in the current supply connection to said first conductor, and a magnet connected to said third conductor and operative upon supply of electric current thereto to effect opening of said interlock switch.

13. The combination with two cars, of an automatic car coupler on each car for connecting the cars, each coupler having a locking member movable to a coupling position and to an uncoupling position, of means on each car for controlling the respective locking member comprising spring means acting on said locking member for urging same to said coupling position, a piston connected with said locking member and adapted to be operated by fluid under pressure supplied to a pressure chamber for moving said locking member to said uncoupling position, a pump operative to supply fluid under pressure to said chamber for actuating said piston, an electric motor for actuating said pump, a selector switch having an uncoupling position for supplying current to actuate said motor and another position for cutting off such supply of current, switch means on the last named car controlling a train line circuit and the supply of current from said selector switch to said motor and operative when closing said train line circuit to open the circuit of said motor, means on the last named car operative by the current supplied by said selector switch in said uncoupling position for actuating said train line switch to open the circuit controlled thereby and upon opening of said circuit to supply current to said motor, said selector switch in its other position cutting off the supply of current to said motor and providing for supply of current through a coupling circuit to said means for actuating said train line switch to close the circuit controlled thereby, and switch means in said coupling circuit carried by said coupler on the last named car and operative to close such circuit only upon coupling of such coupler with the counterpart coupler to thereby provide for movement of said train line switch to its circuit closing position only subsequent to coupling of said two couplers.

14. The combination with two car couplers adapted to be carried by and to connect two cars, uncoupling means associated with each coupler, a control circuit for both of said uncoupling means, connected between the two cars, means connecting both uncoupling means in parallel to said circuit, and control means on each car for controlling said circuit, either control means being operative independently of the other to condition said circuit to effect operation of both of said uncoupling means to uncouple said couplers.

15. The combination with two couplers adapted to be carried by and to connect two cars and two electric contactors adapted to be carried by said cars to cooperate upon connecting said cars to close electric circuits between said cars, uncoupling means associated with each coupler, connecting means operative to connect said uncoupling means on both cars in parallel in one of said circuits and said uncoupling means being operative upon certain conditioning of such circuit to effect uncoupling of said couplers, a circuit breaker on each car for making and breaking another of said circuits, operating means on each car for the respective circuit breaker and connecting means on that car and operative upon said certain conditioning of said one circuit to first actuate said circuit breaker to break the circuit controlled thereby and to then connect said uncoupling means to said circuit, and means for conditioning said circuit.

16. In combination, an electric conductor on each of two coupled vehicles, electric contactors carried by adjacent ends of said vehicles and cooperative to electrically connect said conductor on one vehicle to said conductor on the other vehicle, a circuit breaker on each vehicle arranged to open and close the circuit through the respective conductor thereon, operating means on each vehicle for controlling the respective circuit breaker, an electric control circuit wholly on each vehicle for controlling the respective operating means, said circuit breakers being operable by said operating means to close the circuit controlled thereby upon certain conditioning of the respective control circuits, and means controlled by the coupling and uncoupling of the two vehicles for controlling said control circuit on each vehicle and operable only upon coupling of said vehicles to provide said certain conditioning of said control circuit on each vehicle.

17. A system for controlling the opening and closing of a circuit through a train wire extending through two counterpart connected electric contactors carried by the adjacent ends of two vehicles, said system comprising in combination on each vehicle, a source of electric current, a first conductor, a second conductor, a third conductor, a manually operative selector device having one position for connecting said source of current to said first conductor and for disconnecting said source of current from said second and third conductors and a second position for connecting said second and third conductors to said source of current and for disconnecting said first conductor from said source of current, a switch in said train wire having a closed position for closing said circuit and an open position for opening said circuit, an electric motor for operating said switch to its different positions, switch means associated with said motor and arranged in said closed position of said switch to connect said motor to said second conductor and to break a connection between said motor and said first conductor, and arranged in said open position of said switch to connect said motor to said first conductor and to break the connection between said motor and said second conductor, an interlock switch in the connection between said selector device and said first conductor and having a normal position for closing such connection and a second position for opening such connection, a magnet for controlling said interlock switch and connected to said third conductor, said magnet being energizable by current supplied to said third conductor for opening said interlock switch and deenergizable at other times to effect closure of said interlock switch, said electric contactors connecting said second and third conductors on one vehicle to said second and third conductors, respectively, on the other vehicle.

MORTIMER B. CAMERON.